(12) United States Patent
Canioncq et al.

(10) Patent No.: US 11,551,493 B2
(45) Date of Patent: Jan. 10, 2023

(54) CONTACT PATCH DATA ACQUISITION

(71) Applicant: Melexis Technologies SA, Bevaix (CH)

(72) Inventors: Julien Canioncq, Metabief (FR); Ivan Zagan, Brussels (BE); Yevgeniy Sosuliaka, Kyiv (UA)

(73) Assignee: MELEXIS TECHNOLOGIES SA, Bevaix (CH)

( * ) Notice: Subject to any disclaimer, the term of this patent is extended or adjusted under 35 U.S.C. 154(b) by 338 days.

(21) Appl. No.: 16/880,077

(22) Filed: May 21, 2020

(65) Prior Publication Data
US 2020/0372730 A1 Nov. 26, 2020

(30) Foreign Application Priority Data

May 23, 2019 (EP) .................................. 19176320

(51) Int. Cl.
| | | |
|---|---|---|
| *G07C 5/08* | (2006.01) | |
| *B60C 23/04* | (2006.01) | |
| *G07C 5/00* | (2006.01) | |
| *H01Q 1/22* | (2006.01) | |

(52) U.S. Cl.
CPC ............ *G07C 5/085* (2013.01); *B60C 23/043* (2013.01); *G07C 5/008* (2013.01); *H01Q 1/225* (2013.01); *H01Q 1/2241* (2013.01)

(58) Field of Classification Search
CPC ...... G07C 5/085; G07C 5/008; B60C 23/043; B60C 23/0416; B60C 23/0488; B60C 2019/004; B60C 11/246; B60C 23/064; H01Q 1/2241; H01Q 1/225

USPC .......................................................... 701/33.4
See application file for complete search history.

(56) References Cited

U.S. PATENT DOCUMENTS

| | | | |
|---|---|---|---|
| 6,112,587 A | 9/2000 | Oldenettel | |
| 8,424,375 B2 | 4/2013 | Pannek et al. | |
| 10,052,921 B2 | 8/2018 | Bettecken et al. | |
| 10,214,060 B2 | 2/2019 | Okada et al. | |
| 2010/0179724 A1* | 7/2010 | Weston ................. | B60C 23/007 701/33.4 |
| 2013/0278406 A1* | 10/2013 | Weston ............... | B60C 23/0488 340/442 |

(Continued)

FOREIGN PATENT DOCUMENTS

| | | |
|---|---|---|
| DE | 102014204862 A1 | 9/2015 |
| DE | 112016002494 T5 | 2/2018 |

(Continued)

OTHER PUBLICATIONS

European Search Report from corresponding EP Application No. 19176320, dated Oct. 22, 2019.

*Primary Examiner* — Eric Blount
(74) *Attorney, Agent, or Firm* — Workman Nydegger

(57) ABSTRACT

A sensor system for acquiring a perturbation, induced by a contact patch of a tire, in data generated by a sensor system mounted in the tire, comprises at least one sensor adapted for generating the data related to a physical property of the tire, and an acquisition system comprising memory. The sensor system is adapted for triggering the acquisition system to acquire the data and for storing it in a buffer in the memory, until a predefined delay after the perturbation is recognized. The perturbation is recognized by comparing the stored data with at least one characterizing feature of the perturbation.

15 Claims, 5 Drawing Sheets

(56) References Cited

U.S. PATENT DOCUMENTS

| | | | |
|---|---|---|---|
| 2014/0172251 A1* | 6/2014 | Championnet | G01P 3/44 |
| | | | 701/51 |
| 2014/0326062 A1* | 11/2014 | Weston | B60C 23/0493 |
| | | | 73/146 |
| 2015/0247780 A1* | 9/2015 | Kretschmann | B60C 11/243 |
| | | | 73/146.5 |
| 2016/0303928 A1* | 10/2016 | Benbouhout | B60C 23/0447 |
| 2017/0106706 A1 | 4/2017 | Bettecken et al. | |
| 2017/0334254 A1* | 11/2017 | Limbrunner | B60W 40/12 |
| 2018/0134102 A1 | 5/2018 | Okada et al. | |
| 2018/0244116 A1* | 8/2018 | Zhuk | B60C 23/0416 |
| 2020/0300885 A1* | 9/2020 | Fujii | B60C 23/0416 |

FOREIGN PATENT DOCUMENTS

| | | |
|---|---|---|
| EP | 0895879 A2 | 2/1999 |
| EP | 3366499 A1 | 8/2018 |

* cited by examiner

CONTACT PATCH DATA ACQUISITION

FIELD OF THE INVENTION

The present invention relates to sensor devices mountable in a tire of a vehicle. More specifically it relates to tire mounted sensors (TMS) mounted inside a tire.

BACKGROUND OF THE INVENTION

Tire mounted sensors are mounted inside a tire. An example of a tire 200 in which a sensor 110 is mounted is schematically illustrated in FIG. 1. The sensor is mounted at a certain position of the tire 200. The time period during which this position is part of the contact patch 205 between the tire 200 and the road surface 300 a perturbation will occur in the signal generated by the tire mounted sensor.

Tire mounted sensors are typically being driven by battery power or by an energy harvester. Due to the difficulty to produce automotive compliant memory tire mounted sensors typically only have a limited amount of memory. In order to yield meaningful information for performing accurate measurements, a relatively high sampling rate during the contact patch period is required. This means that the acquisition time is limited, and only meaningful data must be acquired. Also, with respect to power consumption, the number of acquisition sequences must be as low as possible in order to ensure the longest life-time possible of the TMS system.

For example, if a memory of 512 Bytes is embedded in a TMS system, of which ¾ is available for the contact patch data, and a sampling rate of 10 kHz with 16 bits resolution is needed, then the maximum acquisition time is 19 ms. A typical contact patch duration at 30 km/h is about 13 ms.

In some prior art TMS systems the data from the sensors, which are mounted in the tire, is continuously acquired. Such systems, however, require a huge amount of memory in order to achieve the required resolution (i.e. sampling rate).

Alternatively, if the amount of memory is limited, then the sampling rate must be reduced.

Another approach, disclosed in U.S. Pat. No. 8,424,375B2, proposes to use two sampling rates—a first slow sampling rate (SR1) between the contact patches, and a 2nd fast sampling rate (SR2) during the zone of interest (contact patch). Such a sequence is illustrated in FIG. 2. In this example the rotation speed of the wheel is constant resulting in a constant period T1 between the perturbations. In such a method first the period ($T_{rot}$) between two perturbations is estimated. This period is used to determine the sleep period (sleep). Such a method has, however, the disadvantage that upon wake-up, it is necessary to acquire at least two contact patches in order to start the acquisition sequence and set the sleep period. This is slow and disadvantageous in terms of power consumption when contact patch acquisition with a low duty cycle is required (i.e. acquire one single patch every many rotation periods).

Moreover, if the speed of the vehicle is changing (i.e. accelerating or braking), the time between patches is not constant and there is a possibility that the next patch will have missing data (i.e. sampling window started too early or too late). This is illustrated in FIG. 3, wherein the period T1 between the first and the second perturbation is longer than the period T2 between the second and the third perturbation due to a change in rotation speed. The rotation period $T_{rot}$ is determined based on the period between the first perturbation and the second perturbation and the sleep period $T_{sleep}$ is determined starting from $T_{rot}$ assuming that the rotation speed of the wheel is not constant. In FIG. 3 the rotation speed is changed, and this results in an acquisition period $T_{ack}$ which is triggered too late. Hence, some of the contact patch related data will be missing. Moreover, such a solution also requires a high-accuracy clock embedded in the system. In FIG. 3 the sampling rate SR1 during the sleep period $T_{sleep}$ is smaller than the sampling rate SR2 during the acquisition period $T_{ac}k$.

There is a need for TMS systems which are configured to execute good acquisition methods in view of the sampling rate and memory requirements.

SUMMARY OF THE INVENTION

It is an object of embodiments of the present invention to provide a sensor system which can be mounted in a tire and which is configured for executing a good acquisition method and it is an object of embodiments of the present invention to provide a good acquisition method for acquiring data from a tire mounted sensor.

The above objective is accomplished by a method and device according to the present invention.

In a first aspect embodiments of the present invention relate to a sensor system for acquiring a perturbation, induced by a contact patch of a tire, in data generated by a sensor system mounted in the tire. The sensor system comprises at least one sensor adapted for generating the data related to a physical property of the tire, and an acquisition system comprising memory, wherein the sensor system is adapted for triggering the acquisition system to acquire the data and storing it in a buffer in the memory, until a predefined delay after the perturbation is recognized, wherein the perturbation is recognized by comparing the stored data with at least one characterizing feature of the perturbation. The perturbation may for example be a pulse. The at least one characterizing feature may be predefined or it may be adapted in function of the speed of the tire.

Where in embodiments of the present invention reference is made to a sensor which is mounted in the tire, reference is made to a sensor which may be completely integrated in the tire (over-molded), or partially over molded, or attached/glued on the inner surface.

It is an advantage of embodiments of the present invention that the first perturbation in the data, starting from the moment the sensor system is acquiring the data, will be stored by the acquisition system in the buffer. Thus, faster acquisition is possible than in systems wherein at least two sequences need to be acquired in order to start the acquisition sequence and set the sleep period. In such prior art systems the acquisitions are synchronized (i.e specific timing is measured/calculated to ensure proper acquisition of the contact patch).

It is an advantage of embodiments of the present invention that full contact patches (i.e. the complete perturbation induced by a contact patch) are acquired and this even when the rotation speed of the wheel is changing (e.g. when the speed of the vehicle is changing)

In embodiments of the present invention the buffer is a circular buffer.

It is an advantage of embodiments of the present invention that the required memory size can be limited to a size which is sufficient to store the data of a perturbation including the predefined delay.

In embodiments of the present invention the at least one characterizing feature of the perturbation comprises leading edge and/or trailing edge conditions of the perturbation.

Other features of the perturbation, such as for example a peak, may be used for recognizing the perturbation.

In embodiments of the present invention the predefined delay is equal to zero.

In embodiments of the present invention the data is stored in the buffer (e.g. circular buffer) in the memory until a perturbation is present in the circular buffer. This may for example be until a leading edge and a trailing edge of the perturbation in the data are present in the circular buffer.

In case of a circular buffer, according to embodiments of the present invention, it is advantageous that the size of the circular buffer can be minimized such that only the data of the perturbation is stored in the circular buffer.

In embodiments of the present invention the predefined delay is selected depending on the perturbation duration.

In embodiments of the present invention the size of the circular buffer is equal to the size of the data of the perturbation plus the size of the data collected during the predefined delay.

It is an advantage of embodiments of the present invention that the circular buffer has space to ensure that the end of the perturbation can be completely stored. In embodiments of the present invention the predefined delay may be fixed or it may be determined based on the perturbation period.

In embodiments of the present invention the sensor system is adapted for acquiring at least two consecutive perturbations.

In embodiments of the present invention the communication system is adapted for transmitting information of the at least one acquired perturbation.

In embodiments of the present invention the acquired perturbation may be transmitted. In other embodiments not necessarily the complete perturbation is transmitted but the rotation period ($T_{period}$) and/or the perturbation duration ($T_{patch}$) may for example be transmitted. In embodiments of the present invention a combination of the acquired perturbation, the rotation period and the perturbation duration may be transmitted.

In embodiments of the present invention the communication system is adapted for transmitting a period between two consecutive perturbations.

It is an advantage of embodiments of the present invention that the rotation period of the wheel can be determined by measuring the elapsed time Trot between two perturbations. This period may be transmitted.

In embodiments of the present invention the communication system is adapted for collecting the data of at least two perturbations and for averaging the acquired data of the different perturbations before transmitting it.

In embodiments of the present invention the sensor system is adapted for performing an acquisition cycle of waking up, triggering the acquisition system to acquire the data of at least one perturbation, transmitting the acquired data and going to a reduced power state.

In embodiments of the present invention the sensor system is adapted for having a predefined period between consecutive acquisition cycles.

The predefined period can be selected such that a low duty cycle is obtained (i.e. an acquisition is done every many rotation periods of the wheel). It is an advantage of embodiments of the present invention that a lower power consumption can be obtained by increasing the period between consecutive acquisition cycles.

In embodiments of the present invention the sensor is an acceleration sensor.

In embodiments of the present invention the acceleration sensor may be sensitive to radial acceleration. In embodiments of the present invention the acceleration sensor may be sensitive to tangential acceleration or a combination of radial and tangential acceleration.

In a second aspect embodiments of the present invention relate to a method for acquiring a perturbation, induced by a contact patch, in data from a sensor mounted in a tire. The method comprises an acquisition cycle which comprises the following steps:
- acquiring the data from the sensor,
- storing the data in a buffer,
- comparing the data in the buffer with at least one characterizing features of the perturbation thereby obtaining a positive comparison result if the perturbation is present or a negative comparison result if the perturbation is not present,
- repeating the steps of acquiring, storing, and comparing in case of a negative comparison result and before a predefined delay after the first positive comparison result.

In embodiments of the present invention the storing of the data is done in a circular buffer.

In embodiments of the present invention the at least one characterizing feature of the perturbation comprises for example leading edge and/or trailing edge conditions of the perturbation.

In embodiments of the present invention the method comprises transmitting information of the at least one acquired perturbation.

In embodiments of the present invention the acquired perturbation may be transmitted. In other embodiments not necessarily the complete perturbation is transmitted but the rotation period and/or the perturbation duration is transmitted. In embodiments of the present invention the perturbation may be processed before transmitting it.

In embodiments of the present invention the method comprising transmitting the period between two consecutive perturbations.

In embodiments of the present invention the method comprises acquiring a plurality of perturbations and waiting a predefined period between the acquisition cycles.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
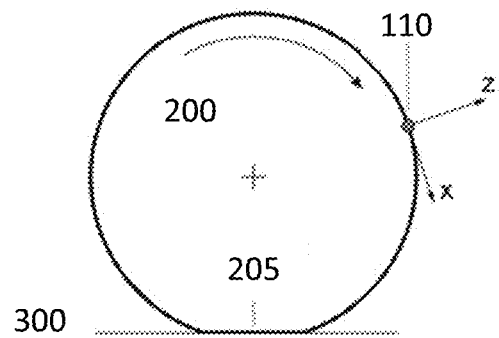
FIG. 1 shows a schematic drawing of a tire in which a sensor is mounted.
Figure 2:
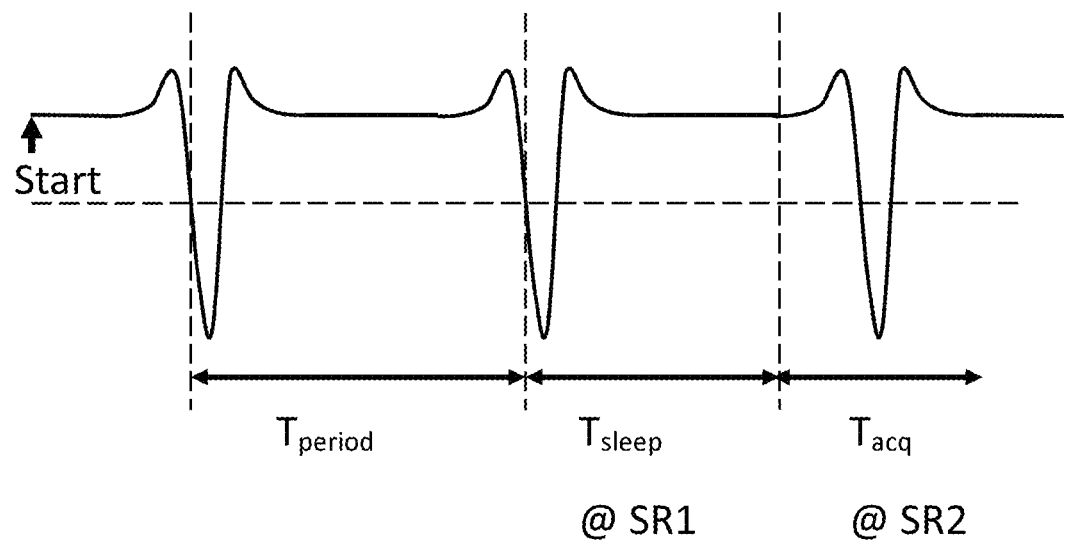
FIG. 2 shows a diagram of a contact patch induced perturbation sequence in function of time on which a prior art acquisition scheme is indicated.
Figure 3:
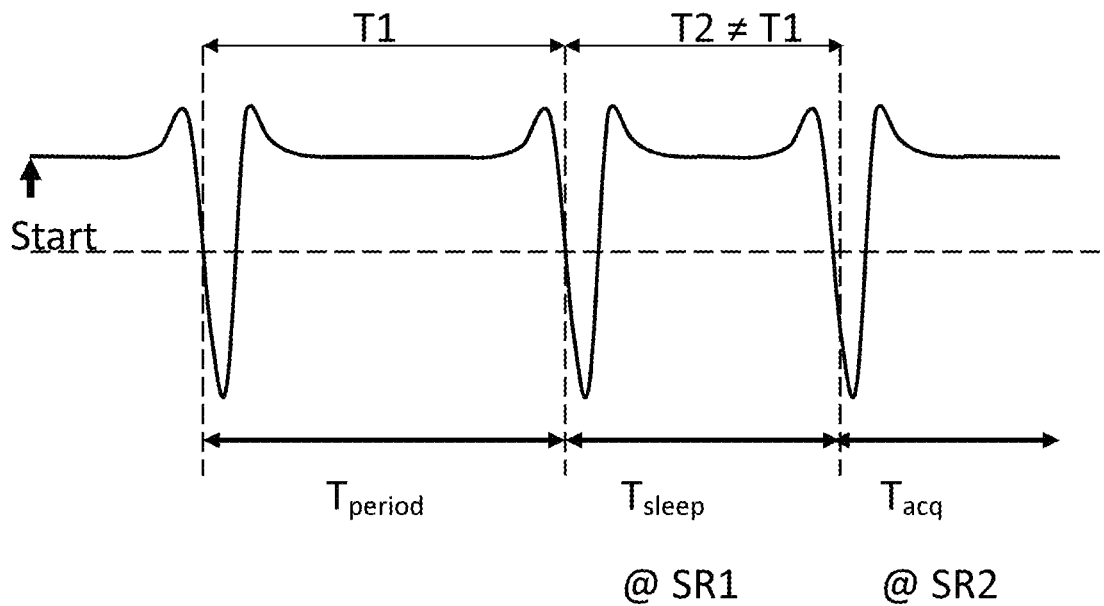
FIG. 3 shows a diagram of a contact patch induced perturbation sequence in function of time with a varying rotation speed of the wheel for which the perturbation acquisition was done using the method illustrated in FIG. 2.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 4:
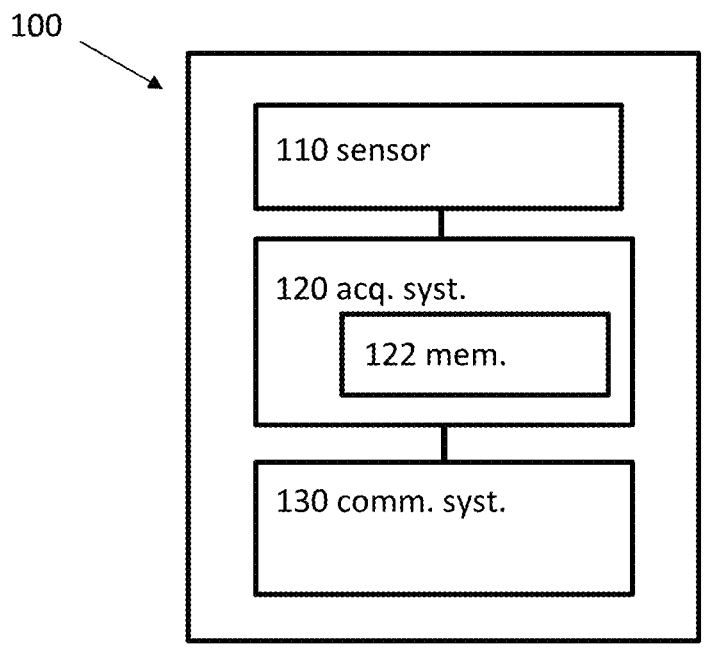
FIG. 4 shows a schematic drawing of a sensor system in accordance with embodiments of the present invention.

In a first aspect embodiments of the present invention relate to a sensor system 100 for acquiring a perturbation, induced by a contact patch of a tire, in data of a sensor system mounted in the tire. The sensor system 100 may be mounted in the tire on the inner liner of the tire. A schematic block diagram of such a sensor system is shown in FIG. 4.

It shows a sensor system 100 in accordance with embodiments of the present invention which comprises at least one sensor 110 adapted for generating data related to a physical property of the tire, an acquisition system 120 comprising memory 122, and a communication system 130. The sensor may for example be an acceleration sensor, an ultrasonic sensor, a piezoelectric sensor, an optical sensor, a magnetic sensor, a deformation sensor, or a shock sensor. Different sensors may be combined. A physical property of the tire may for example be a dynamic property. For example the perturbation may be measured using an acceleration sensor.

Figure 5:
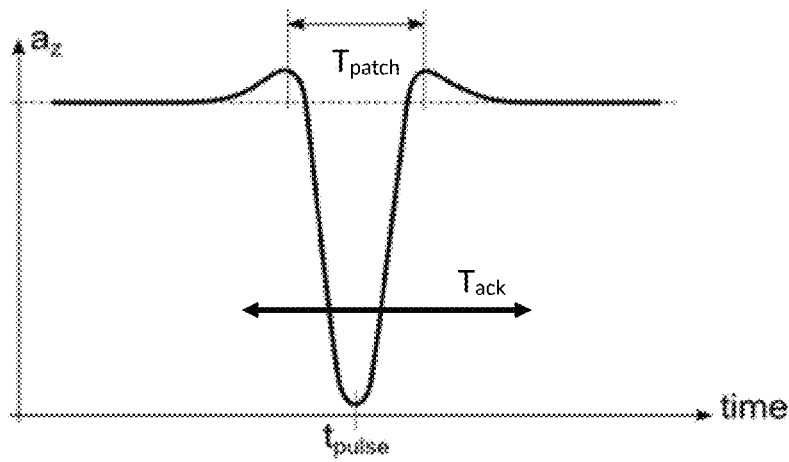
FIG. 5 shows a diagram of a contact patch induced perturbation in function of time.

When such a sensor system 100 is mounted inside the tire, it will rotate together with the tire. The contact between the tire and the ground results in a deformation of the tire. This deformation results in an additional change of the physical property of the tire which is measured by the sensor 110. Hence, a perturbation will be present in the data from the sensor. This perturbation is induced by the contact patch nearby the sensor. Acquiring the sensor data during this contact patch period is also referred to as contact patch acquisition. An example of such a perturbation is shown in FIG. 5. It shows the perturbation generated by an acceleration sensor. The amplitude of the perturbation is shown in function of time. The perturbation has a falling edge from a first maximum to a minimum (at moment $t_{perturbation}$) and a rising edge from the minimum to a second maximum. The duration between the first maximum and the second maximum is equal to $T_{patch}$. The useful information is mainly present in the perturbation.

In embodiments of the present invention the sensor system 100 is adapted for triggering the acquisition system 120 to acquire the data from the sensor and to store it in a buffer in the memory 122. This may be a circular buffer, also referred to as a loop table, ring buffer, or circular queue.

Specific implementations of a ring buffer are for example a ping pong buffer or a bip buffer.

In embodiments of the present invention the acquisition of the data may be performed using an analog to digital converter (ADC). This ADC converts an analog signal from the sensor into digitized data. The acquisition system samples the data from the analog to digital converter and stores it in the buffer.

In embodiments of the present invention the data is stored in the buffer in the memory 122. By comparing the stored data with at least one characterizing feature of a perturbation induced by a contact patch the acquisition system determines whether the perturbation is present in the data in the buffer. In embodiments of the present invention data is stored in the buffer (which may be a circular buffer) until a predefined delay after a perturbation in the data is recognized. It is thereby advantageous that the first perturbation after starting the acquisition is acquired.

In embodiments of the present invention the predefined delay may be zero. In embodiments of the present invention the predefined delay is selected depending on the perturbation duration. It may for example be proportional to the perturbation duration. In embodiments of the present invention the buffer may be a circular buffer. The size of the circular buffer may be such that data collected during the period $T_{ack}$ in FIG. 5 can be stored in the circular buffer.

In embodiments of the present invention the acquisition system is continuously filling the (circular) buffer with the data until the perturbation is recognized by comparing it with at least one characterizing feature of the perturbation. A leading and a trailing edge of the contact patch may for example be detected in the (circular) buffer (e.g. when the perturbation is a pulse with a leading edge and a trailing edge). In that case the at least one characterizing feature of the perturbation comprises leading edge and/or trailing edge conditions of a perturbation related to the occurrence of a contact patch. These leading edge and trailing edge conditions may for example be thresholds. The leading edge may for example be detected when a predefined leading edge threshold is crossed by the data and the trailing edge may be detected when the trailing edge threshold is crossed by the data. When the leading edge and the trailing edge are determined, the perturbation is present in the buffer. The leading edge may for example be a falling edge and the trailing edge a rising edge. Other features of the perturbation, such as for example a peak, may be used for recognizing the perturbation. Peak detection can for example be used in case of a sensor which produces a tangential acceleration signal.

In embodiments of the present invention comparing the stored data with at least one characterizing feature of the perturbation may comprise processing the data. The processing may for example comprise performing a Fast Fourier Transform (FFT) on the data. The at least one characterizing features of the perturbation is in that case a characterizing feature of the processed data (for example an edge or a peak in the processed data).

In embodiments of the present invention the sensor system 100 is adapted for going into low power mode in between perturbation acquisitions. In such sensor systems 100 the sensor system wakes up and triggers the acquisition system to acquire the data from the sensor. The acquisition is adapted for acquiring the data and for storing it in the buffer. In case of a circular buffer, this buffer may for example achieved by filling a loop table until the end of the table, after which the loop table is filled from the beginning. In general a circular buffer may be achieved by filling the buffer until it is full and from then onwards by overwriting the oldest sample with the newest sample. This is done continuously until a perturbation in the data, which is caused by a contact patch, is detected in the loop table (e.g. until the leading and trailing edge are detected in the data, or until a peak is detected in the data, or any other characterising feature of the perturbations).

As described above, the acquisition system may wait for a predefined delay to ensure that the full patch is acquired (this is an optional feature). This delay may for example depend on the duration of a patch related perturbation (T patch).

In embodiments of the present invention the sensor system comprises a communication system which is adapted for transmitting information of the acquired perturbation induced by the contact patch after it is detected by the acquisition system. The information may be the complete perturbation, it may be part of the perturbation or it may be processed perturbation data of one or more perturbations.

After detecting the at least one perturbation, the acquisition may be stopped and information of the at least one perturbation induced by the contact patch is transmitted. This may be done by wireless transmission (e.g. by Radio Frequency (RF) or Bluetooth Low Energy (BLE) or ultra high frequency (UHF)).

In embodiments of the present invention the sensor system may be adapted for acquiring one or more perturbations and for processing the one or more acquired perturbations before transmitting the processing result. The processing may for example comprise calculating a moving average, calculating an exponential moving average, digital filtering. In embodiments of the present invention the acquisition system is adapted for acquiring a plurality of perturbations induced by several contact patches and for averaging them before transmitting the averaged perturbation.

In embodiments of the present invention the sensor system 100 is configured such that after transmitting the detected perturbation, the sensor system goes back to sleep mode resulting in a reduced power consumption.

A sensor system 100 according to embodiments of the present invention may be battery powered. Alternatively an energy harvester may be used for powering the sensor system. It is advantageous that the sensor system goes into sleep mode after transmitting the perturbation as this will result in reduced power consumption.

Figure 6:
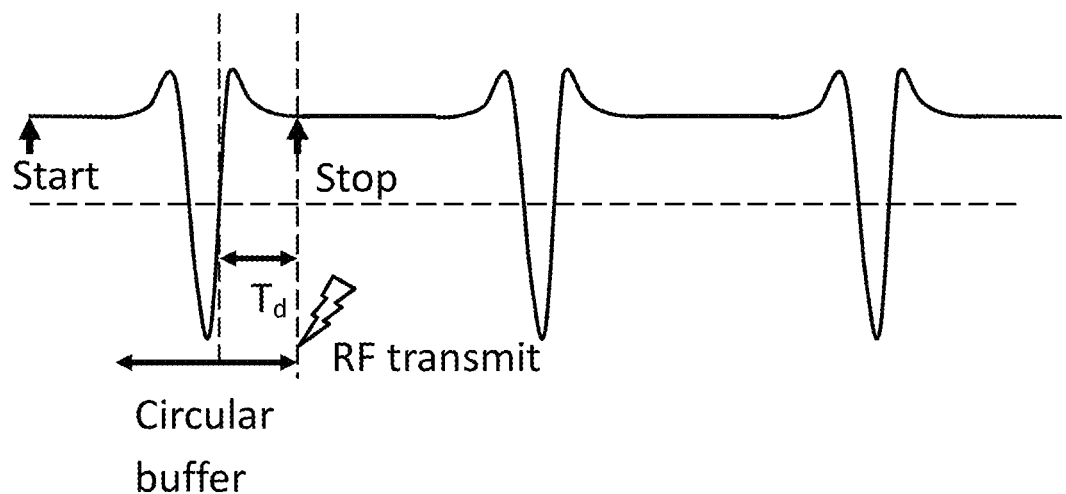
FIG. 6 shows a diagram of a contact patch induced perturbation sequence in function of time on which an acquisition scheme in accordance with embodiments of the present invention is indicated.

FIG. 6 shows a diagram of a contact patch induced perturbation sequence in function of time. At the start moment the sensor system wakes up and triggers the acquisition system to acquire data from the sensor. In this example the sensor is an acceleration sensor. The invention is, however, not limited thereto. The start of acquisition is indicated by the first vertical dashed line. A predefined delay ($T_D$) after the perturbation in the data is recognized the buffering is stopped. This moment is indicated by the second vertical dashed line. In this example the predefined delay starts from the moment the trailing edge of the perturbation crosses the trailing edge threshold. The data between the dashed lines is stored in the (circular) buffer. This data is transmitted by the communication system. The two subsequent perturbations in the trace in FIG. 5 are not sampled by the sensor system. Only after a predefined period the sensor system will wake up again and acquire a new perturbation. By increasing the predefined period, the power consumption of the sensor system will decrease.

Figure 7:
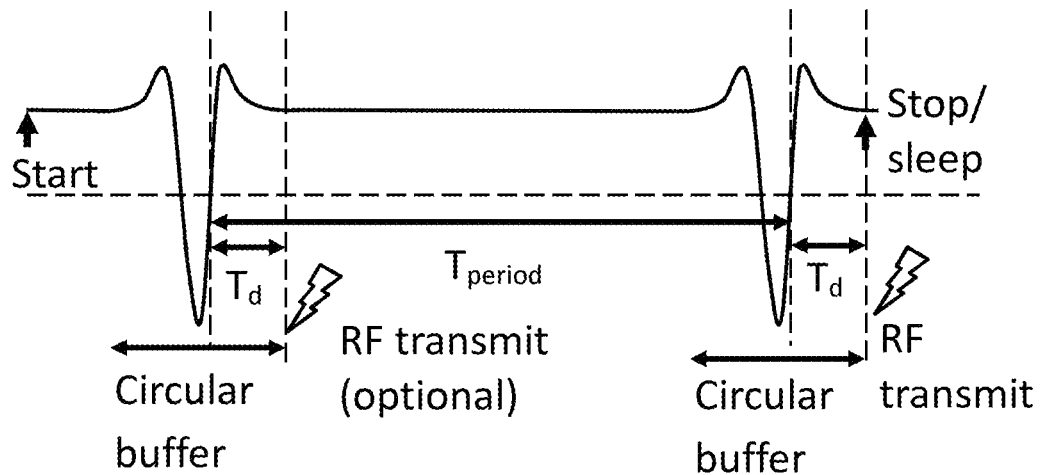
FIG. 7 shows a diagram of a contact patch induced perturbation sequence in function of time on which an acquisition scheme comprising two transmissions, in accordance with embodiments of the present invention, is indicated.

In embodiments of the present invention the sensor system is adapted for acquiring and transmitting (at least) two contact patches successively. This may be done to measure the rotation period of the wheel. Sampling of the data may be done at a single sampling rate. An example thereof is illustrated in FIG. 7. It shows a diagram of a contact patch induced perturbation sequence in function of time on which an acquisition scheme comprising two transmissions, in accordance with embodiments of the present invention, is indicated. After the first perturbation is stored in the (circular) buffer, it is transmitted by the communication system. Next the second perturbation is stored in the (circular) buffer and the second perturbation is transmitted by the communication system. After transmitting the second perturbation the system goes in sleep mode which has a reduced power consumption. In the example the data is sampled at a single sampling rate. The period $T_{period}$ between the two consecutive perturbations can be used to determine the speed of the wheel. This period can be transmitted together with the acquired perturbation. In an alternative embodiment only the period $T_{period}$ between the two consecutive perturbations is transmitted. In embodiments of the present invention the sampling rate may for example range between 1 kHz and 20 kHz, for example between 5 kHz and 15 kHz.

Figure 8:
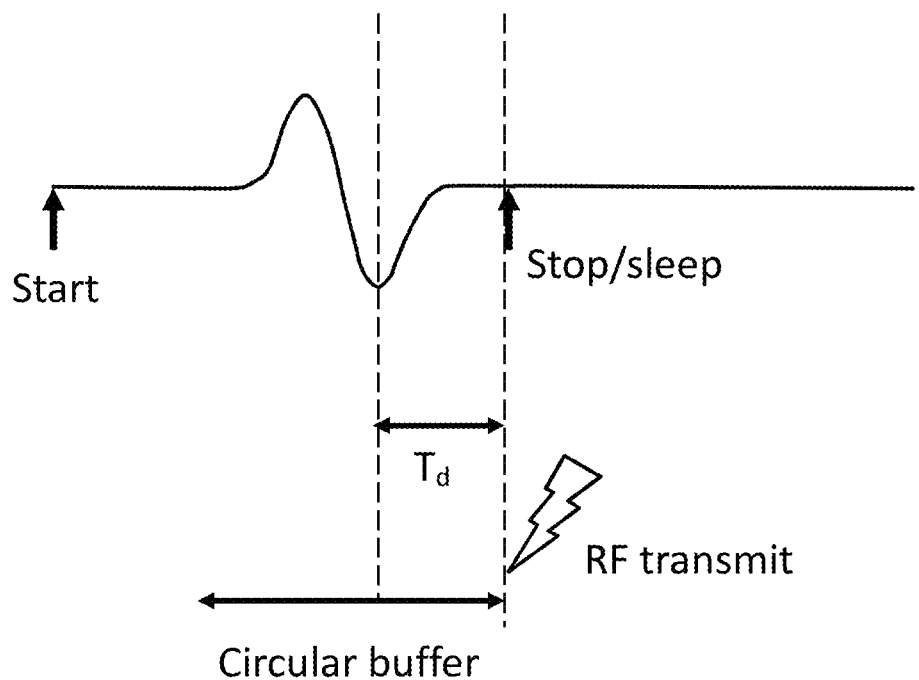
FIG. 8 shows a diagram of a contact patch induced perturbation generated by an acceleration sensor which is sensitive to tangential acceleration wherein the perturbation is recognized by means of peak detection.

FIG. 8 shows a diagram of a contact patch induced perturbation generated by an acceleration sensor which is sensitive to tangential acceleration wherein the perturbation is recognized by means of peak detection. The tangential acceleration corresponds with the acceleration along the x-axis in FIG. 1. In this exemplary embodiment the perturbation is recognized by detecting the second peak. The characterizing feature may for example be a threshold for determining the second peak or an expected shape of the second peak which can be correlated with the measured data. In embodiments of the present invention the perturbation may be recognized by detecting the first peak and the second peak. In that case the characterizing features relate to the first peak and the second peak. A predefined delay after the perturbation is recognized, information of the acquired perturbation is transmitted and the sensor system goes to sleep mode.

The transmitted perturbations can be received by a receiver in the car, which can further analyse the received data. It is thereby advantageous that only the perturbations induced by the contact patches are transmitted as these perturbations are providing far more information than the data in between the perturbations. Omitting the transmission of the data in between the perturbations allows to reduce the memory requirements and the power requirements.

The data may for example be received by an engine control unit. Alternatively, or additionally the data may be send to a remote system/cloud.

In embodiments of the present invention the acceleration sensor is an accelerometer sensitive to the radial acceleration.

In embodiments of the present invention the acceleration sensor is an accelerometer sensitive to the tangential acceleration.

Figure 9:
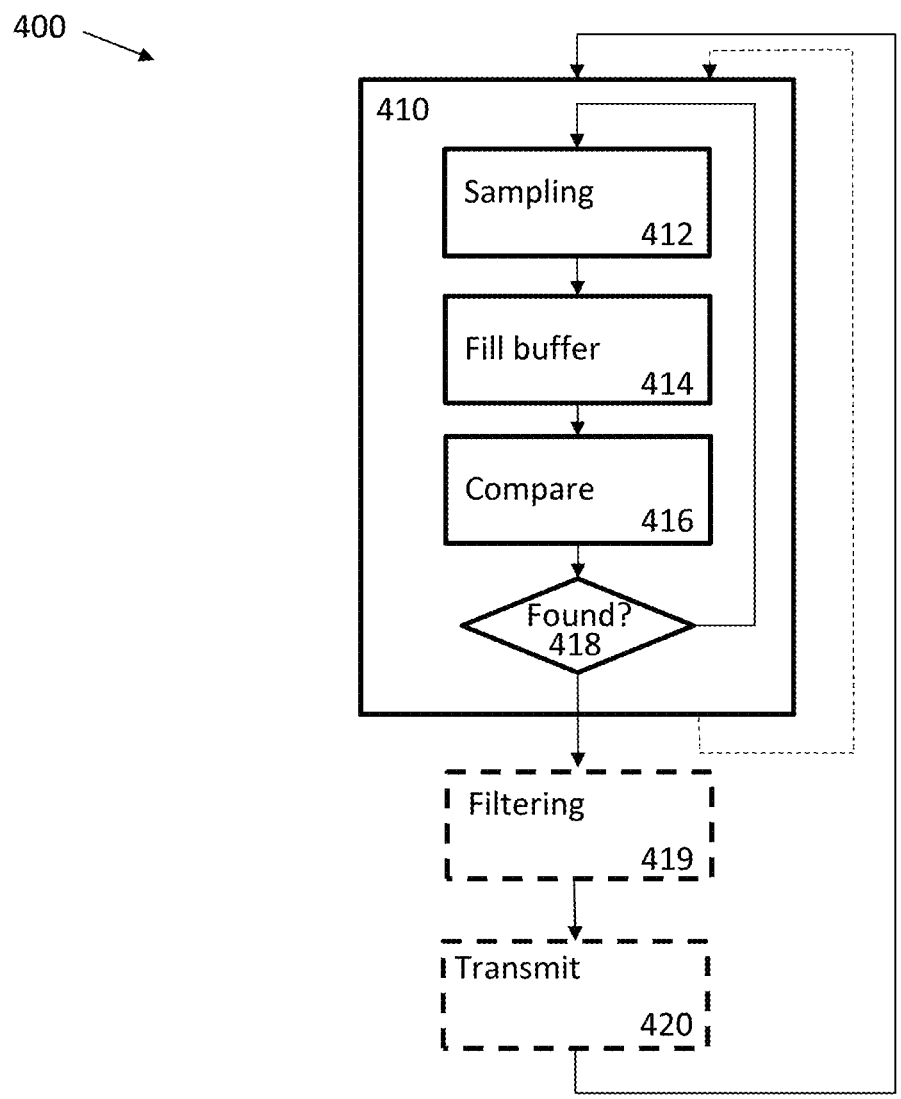
FIG. 9 shows a flow chart of a method in accordance with embodiments of the present invention.

In a second aspect embodiments of the present invention relate to a method for acquiring data of a sensor mounted in a tire. Using a method in accordance with embodiments of the present invention it is possible to retrieve a perturbation in the data which is induced by a contact patch. A flow chart of such a method 400 is shown in FIG. 9. The method comprises an acquisition cycle 410, which comprises the following steps:

acquiring 412 the data from the sensor, storing 414 the data in a buffer (this may be a circular buffer also referred to as loop table; when arriving at the end of the table filling continuous from the beginning of the table), comparing 416 the data in the buffer with at least one characterizing feature of the perturbation thereby obtaining a positive comparison result if the perturbation is present or a negative comparison result if the perturbation is not present.

repeating the steps of acquiring 412, storing 414, and comparing 416 in case of a negative comparison result and before a predefined delay after the first positive comparison result. In embodiments of the present invention the predefined delay may be zero.

In embodiments of the present invention the at least one characterizing feature of the perturbation may for example comprise leading edge and/or trailing edge conditions of the perturbation or it may for example comprise peak information, or any other perturbation characterizing information.

In embodiments of the present invention information of one or more perturbations may be transmitted 420.

In embodiments of the present invention the method may comprise processing the one or more acquired perturbations before transmitting the processed information. This is illustrated by the optional filtering step 419 in FIG. 9. A sequence of perturbations may for example be averaged before the averaged result is transmitted. In another example the period between consecutive perturbations may be transmitted. Also, individual perturbations may be processed. For example by filtering them. A moving average or an exponential moving average, or digital filtering may for example be applied on a single perturbation.

In embodiments of the present invention the obtained perturbations induced by the contact patches may further be used for many measurement purposes such as for example obtaining an estimate for the vehicle load, obtaining an estimate for the tire tread depth, obtaining an estimate for the wheel rotation angle, obtaining an estimate for vehicle speed, determining the road condition, etc.

The invention claimed is:

1. A sensor system mountable in a tire, the sensor system comprising at least one sensor adapted for generating the data related to a physical property of the tire, and an acquisition system comprising memory, wherein the sensor system is adapted for triggering the acquisition system to acquire the data and storing it in a buffer in the memory, wherein the sensor system is configured for acquiring a perturbation which is induced by a contact patch of a tire, in data generated by a sensor system mounted in the tire, and that the data is acquired and stored until a predefined delay after the perturbation is recognized, wherein the perturbation is recognized by comparing the stored data with at least one characterizing feature of the perturbation.

2. The sensor system according to claim 1, wherein the buffer is a circular buffer.

3. The sensor system according to claim 1, wherein the at least one characterizing feature of the perturbation comprises leading edge and/or trailing edge conditions of the perturbation.

4. The sensor system according to claim 1, wherein the predefined delay is substantially zero.

5. The sensor system according to claim 1, wherein the predefined delay is selected depending on the perturbation duration.

6. The sensor system according to claim 2, wherein the size of the circular buffer is equal to the size of the data of the perturbation plus the size of the data collected during the predefined delay.

7. The sensor system according to claim 1, adapted for acquiring at least two consecutive perturbations.

8. The sensor system according to claim 1, comprising a communication system adapted for transmitting information of the at least one acquired perturbation.

9. The sensor system according to claim 8, wherein the communication system is adapted for transmitting a period between two consecutive perturbations.

10. The sensor system according to claim 8, wherein the sensor system is adapted for performing an acquisition cycle of waking up, triggering the acquisition system to acquire the data of at least one perturbation, transmitting the acquired data and going to a reduced power state.

11. The sensor system according to claim 10, adapted for having a predefined period between consecutive acquisition cycles.

12. The sensor system according to claim 1, wherein the sensor is an acceleration sensor.

13. A method for acquiring data from a sensor mounted in a tire, the method comprising an acquisition cycle comprising:
    acquiring the data from the sensor;
    storing the data in a buffer;
    acquiring a perturbation, induced by a contact patch, in the data from the sensor by comparing the data in the buffer with at least one characterizing feature of the perturbation thereby obtaining a positive comparison result if the perturbation is present or a negative comparison result if the perturbation is not present; and
    repeating the steps of acquiring, storing, and comparing in case of a negative comparison result and before a predefined delay after the first positive comparison result.

14. The method according to claim 13, wherein the storing of the data is done in a circular buffer.

15. The method according to claim 13, the method comprising transmitting information of the at least one acquired perturbation.

* * * * *